Patented Feb. 1, 1944

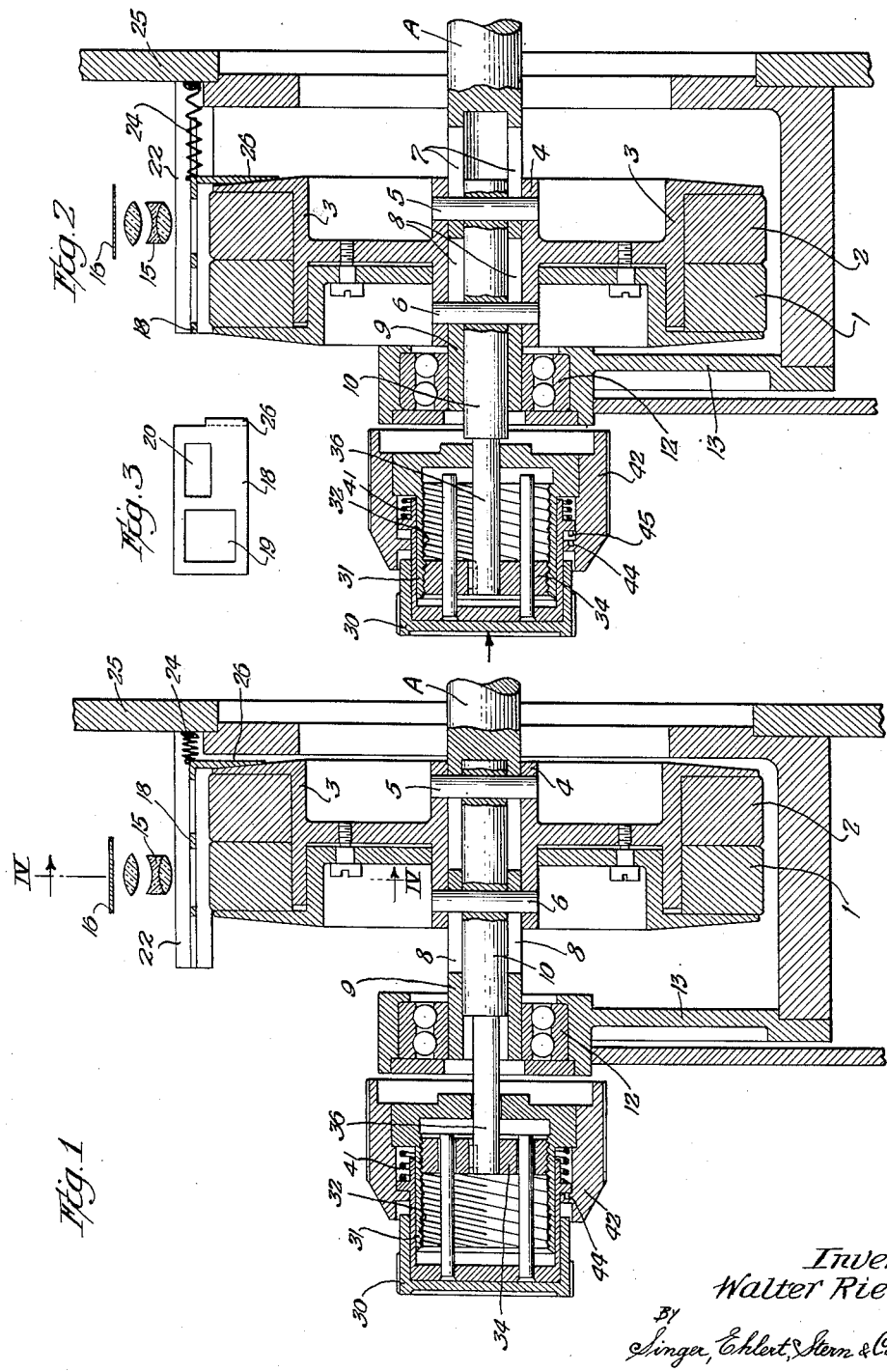

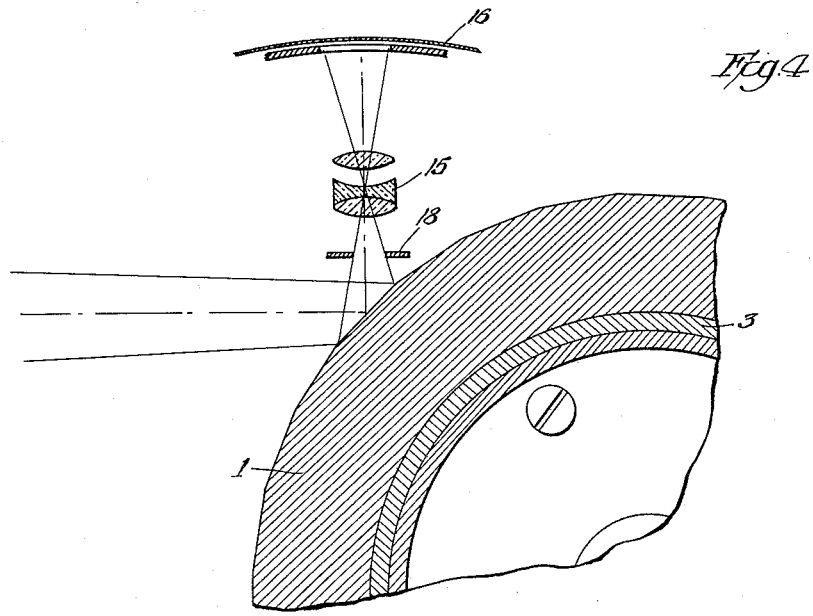
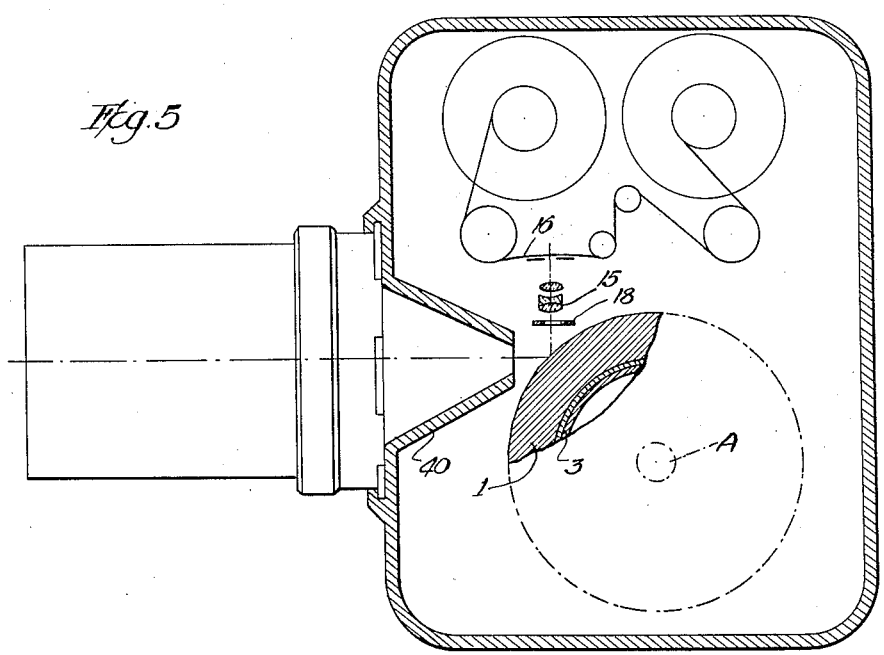

2,340,564

UNITED STATES PATENT OFFICE 2,340,564

MOTION PICTURE CAMERA

Walter Riedel, Dresden, Germany; vested in the Alien Property Custodian

Application June 23, 1941, Serial No. 399,247
In Germany March 14, 1940

8 Claims. (Cl. 88—16.8)

The invention relates to improvements in motion picture cameras and particularly is directed to cameras provided with means for changing the picture frequency.

The picture frequency in motion picture cameras may be increased above the standard frequency in various manners. It is customary to reduce the size of the picture when a higher picture frequency is to be employed. In cameras provided with a stationary camera objective it is common to employ prism attachments for the aforesaid purpose. These attachments are built to either double or quadruple the picture frequency. Attachments of this type, however, have the following disadvantages:

(1) They cause a greater loss of light.
(2) They require a special adapter and therefore are not employable without other means with supplementary accessories, such as telephoto and proxar lenses.
(3) They are very sensitive.

It is an object of the present invention to overcome these disadvantages by solving the problem of doubling the picture frequency in a different manner. The standard picture frequency is obtained by a rotary mirror drum provided with a predetermined number of mirrors. In order to increase the picture frequency the number of the mirrors on the drum is increased, but all the other conditions, as for instance the drive of the drum, remain the same. If, for instance, the number of the mirrors is doubled the standard mirror field is halved and therewith the picture frequency is doubled.

Another object of the invention is to provide the motion picture camera with a plurality of series of mirrors, each comprising a different number of mirrors, for instance 30 and 60 mirrors, respectively, which selectivity may be shifted into the light path of the camera objective. The plurality of series of mirrors, according to another object of the invention, is mounted on a common rotatable drum, which in turn is axially slidably mounted on a shaft so that upon a sliding movement of the drum any one of the plurality of series of mirrors may be shifted into operative position, i. e., into the light path of the camera objective.

It is also an object of the invention to provide a diaphragm between the rotating series of mirrors and the camera objective, which diaphragm is automatically changed to the required size when the selected series of mirrors is moved into operative position. While it is obvious that upon a change of the picture frequency the aperture of the diaphragm has to be varied, until now such an adjustment of the diaphragm took place manually in a separate operation and not automatically as in the present invention.

The novel arrangement of the picture frequency changing device of the present invention has the advantage that any supplemental lenses, as for instance, a telephoto lens or an attachment permitting a reproduction of an object in a ratio 1:1 may be employed without any change. Furthermore, owing to the arrangement of the series of mirrors in a casing a permanent protection of the delicate optical parts is assured, while a change of the picture frequency to a higher rate is instantaneously possible by merely shifting the series of mirrors containing the higher number of mirrors into operative position.

Other objects of the invention will be apparent or will be specifically pointed out in the description forming a part of this specification. The invention is not limited, however, to the embodiment herein described, as various forms may be adopted within the scope of the claims.

Referring to the drawings which illustrate by way of example one embodiment of the invention:

Figure 1 is a longitudinal sectional view of a mirror drum provided with two series of mirrors, one series of which is in operative position as indicated by the diagrammatically shown camera objective, Figure 2 is a similar sectional view of the mirror drum as Fig. 1, except that the outer series of mirrors is shown as being shifted into the light path of the camera objective.

Figure 3 is a plan view of the diaphragm which is mounted between the camera objective and the mirror drum, Figure 4 is a cross-sectional view of the mirror drum along the line IV—IV of Fig. 1, and Fig. 5 illustrates diagrammatically a motion picture camera of the invention provided on its front wall with a detachable auxiliary lens system.

In accordance with the present invention a shaft A, which is driven by a gearing (not shown), has axially slidable thereon a drum 3 provided on its circumference with two series of mirrors 1 and 2, respectively. In the illustrated embodiment the series 1 comprises 30 mirrors and the series 2 comprises 60 mirrors. The hub 4 of the drum 3 is connected by a pair of keys 5 and 6, which pass through diametrically opposed slots 7 and 8 in the tubular end portion 9 of the shaft A, to a manually operable shaft 10 extending into the bore of the tubular end portion 9. The slots 7 and 8 extend longitudinally of the shaft A and permit an axial shifting of the drum 3 on its supporting shaft A. The outer end of the tubular shaft portion 9 is supported by a bearing 12 secured to a wall 13 of the housing.

In Fig. 1 the series 1 of the mirrors is arranged in operative position, i. e., it is positioned in the path of light of the camera objective indicated diagrammatically at 15. When the drum 3 is shifted toward the left, as illustrated in Fig. 2, the series 2 of the mirrors is positioned in the path of light of the camera objective 15. The light sensitive motion picture film is designated with 16 and the latter receives an image of the subject photographed from the camera objective 15, which in turn is focused at the image appearing in a mirror of either series 1 or 2 as the case may be. The mirrors are mounted inclined with respect to the optical axis so as to properly deflect the image of the subject photographed into the camera objective. The light from the subject photographed passes through a suitable light shaft 40 (Fig. 5) onto the mirror.

A diaphragm plate 18 provided with two laterally spaced apertures 19 and 20 is slidably mounted in a frame 22 between the camera objective 15 and the mirrors on the drum 3. A pressure spring 24 attached with one end to a wall 25 of the housing and engaging with its other end the diaphragm plate 18 urges the latter automatically into a position in which a lateral projection 26 of the plate 18 engages an end face of the drum 3. It thus will be seen that in Fig. 1 the larger aperture 19 of the diaphragm plate 18 is in axial alinement with the camera objective 15 to properly control the light coming from an image reflected by the mirrors of series 1, while in Fig. 2 the smaller aperture 20 is in axial alinement with the camera objective 15 to control the light coming from smaller images reflected from the mirrors of the series 2 which contains 60 mirrors.

The drum 3 is adapted to be axially shifted by a manually rotatable knob 30 to bring selectively either one of the mirror series 1 or 2 in operative position with respect to the camera objective 15. A cylindrical part 31 of the knob 30 has an interior worm thread 32 of high pitch which engages a corresponding exterior thread on the outer circumference of a collar 34 fixedly attached to the reduced outer end 36 of the shaft 10, which by means of the keys 5, 6 is connected with the hub 4 of the drum 3. Upon axially pushing the knob 30 inwardly into the holder 42 against the action of the spring 41 and thereupon rotating the knob 30 relatively to the shaft 10, 36 the collar 34 and therewith the drum 3 is axially shifted from the position illustrated in Fig. 1 to the position illustrated in Fig. 2 and vice versa. The knob 30 is provided in its interior with means 44, 45 for locking the drum 3 in its two selectively employable operative positions. Fig. 2 illustrates the drum 3 in its extreme left hand position, with the knob 30 still pushed in, as indicated by the arrow, and therefore unlocked. Upon release of the knob 30 the spring 41 will urge the same outwardly to its locked position as shown in Fig. 1.

What I claim as my invention is:

1. In a motion picture camera, a camera objective, and means for operating the camera with two different picture frequencies, said means including two series of mirrors, each of which comprises a different number of mirrors, a rotatable drum on the circumference of which is arranged said two series of mirrors in coaxial relation, the mirrors of each series being spaced uniformly from each other around the entire circumference of said drum, means for shifting said drum in axial direction for selectively bringing either one of said two mirrors into operative position with respect to said camera objective, a diaphragm positioned between said camera objective and said two series of mirrors, said diaphragm being provided with two apertures of different size, one for each series of mirrors, and means for adjusting said diaphragm simultaneously with said drum for maintaining the proper aperture in operative relation with the respective series of mirrors.

2. In a motion picture camera, a camera objective, and means for operating the camera with different picture frequencies, said means including a plurality of series of mirrors, each of which comprises a different number of mirrors, a rotatable drum on the circumference of which is arranged said plurality of series of mirrors, these series being adjacent each other, the mirrors of each series being spaced uniformly from each other around the entire circumference of said drum, means for shifting said drum in axial direction for selectively bringing any one of said plurality of series of mirrors into operative position with respect to said camera objective, a diaphragm positioned between said camera objective and said plurality of series of mirrors, said diaphragm being provided with a number of apertures of different size, one for each series of mirrors, and means operatively connected with said drum for adjusting said diaphragm at the same time said drum is axially shifted, whereby the apertures in said diaphragm remain in operative relation with their associated series of mirrors.

3. In a motion picture camera, a camera objective, and means for operating the camera with different picture frequencies, said means including a plurality of series of mirrors, each of which comprises a different number of mirrors, a driven shaft, a drum axially slidable on said shaft and rotating with the latter, said plurality of series of mirrors being mounted on the circumference of said drum adjacent each other, the mirrors of each series being spaced uniformly from each other around the entire circumference of said drum, manually operable means for shifting said drum in axial direction for selectively bringing any one of said plurality of series of mirrors into operative position with respect to said camera objective, a diaphragm positioned between said camera objective and said plurality of series of mirrors, said diaphragm being provided with a number of apertures of different size, one for each series of mirrors, and means operatively connected with said drum for adjusting said diaphragm at the same time said drum is axially shifted, whereby the apertures in said diaphragm remain in operative relation with their associated series of mirrors.

4. In a motion picture camera, a camera objective, and means for operating the camera with two different picture frequencies, said means including two series of mirrors, each of which comprises a different number of mirrors, a rotatable drum on the circumference of which is arranged said two series of mirrors in coaxial relation, the mirrors of each series being spaced uniformly from each other around the entire circumference of said drum, means for shifting said drum in axial direction for selectively bringing either one of said two mirrors into operative position with respect to said camera objective, a diaphragm positioned between said camera objective and said two series of mirrors, and means for adjusting said diaphragm simultaneously with said drum for maintaining the proper diaphragm aperture in operative relation with the respective series of mirrors.

5. In a motion picture camera, a camera objective, and means for operating the camera with different picture frequencies, said means including a plurality of series of mirrors, each of which comprises a different number of mirrors, a driven shaft, a drum axially slidable on said shaft and rotating with the latter, said plurality of series of mirrors being mounted on the circumference of said drum adjacent each other, the mirrors of each series being spaced uniformly from each other around the entire circumference of said drum, manually operable means for shifting said drum in axial direction for selectively bringing any one of said plurality of series of mirrors into operative position with respect to said camera objective, a diaphragm positioned between said camera objective and said plurality of series of mirrors, and means operatively connected with said drum for adjusting said diaphragm at the same time said drum is axially shifted.

6. In a motion picture camera, a camera objective, and means for operating the camera with two different picture frequencies, said means comprising a plurality of series of light deflecting elements each of which series is made up of a different number of elements, a rotatable drum, each of said series of elements being mounted on the drum for rotation therewith and being arranged around the drum in coaxial relation to the drum and in adjacent relation to each other, the elements of each series being spaced uniformly from each other around the drum, means for shifting the drum in axial direction for selectively bringing either of the series of elements into operative position with respect to the camera objective, a diaphragm positioned between said camera objective and said series of elements, said diaphragm being provided with a plurality of apertures of different size, one aperture for each series of elements, and means for adjusting said diaphragm simultaneously with said drum for maintaining the proper aperture in operative relation with the respective series of elements.

7. In a motion picture camera having a camera objective and means for operating the camera with different picture frequencies, the combination of a rotatable shaft, a drum mounted on said shaft, said drum having a hub through which said shaft extends, said shaft having a tubular portion at one end thereof, a plurality of series of light deflecting elements mounted on said drum in coaxial relation thereto and in adjacent relation to each other, each series of elements being made up of a different number of elements and the elements of each series being spaced uniformly around the drum, a second shaft, said second shaft extending within the tubular portion of the first shaft, key means engaged by the hub of the drum and both of said shafts whereby the drum is rotatable with the first shaft and is movable axially thereof on the axial movement of the second shaft, a collar fixed on the second shaft which projects from the tubular portion of the first shaft, sleeve means coaxially arranged around said second shaft and threadably engaging said collar whereby to move said second shaft axially of itself on the rotation of said sleeve means with respect to said collar.

8. In a motion picture camera, a camera objective, and means for operating the camera with different picture frequencies, said means including a plurality of series of light deflecting elements, each of said series of elements comprising a different number of elements, a driven shaft, a drum axially slidable on said shaft and rotating with the shaft, said series of elements being mounted around said drum in coaxial relation to the drum and in adjacent relation to each other, the elements of each series being uniformly spaced from each other, manually operable means for shifting said drum in axial direction for selectively bringing any one of said plurality of series of elements into operative position with respect to said camera objective, a diaphragm plate positioned between said camera objective and said series of elements, said plate being slidably mounted and being provided with a separate aperture for each series of elements, a projecting portion on said diaphragm plate, and resilient means in contact with said diaphragm plate to constantly urge the projecting portion thereof against said drum whereby to simultaneously adjust the plate aperture to correspond to the series of elements to be used for picture taking purposes on the axial movement of the drum to bring a desired series of elements into operating position.

WALTER RIEDEL.